United States Patent

[11] 3,589,235

| [72] | Inventor | Howard G. Rogers<br>Weston, Mass. |
|---|---|---|
| [21] | Appl. No. | 797,555 |
| [22] | Filed | Feb. 7, 1969 |
| [45] | Patented | June 29, 1971 |
| [73] | Assignee | Polaroid Corporation<br>Cambridge, Mass. |

[54] COMPACT VIEWFINDER
8 Claims, 1 Drawing Fig.

| [52] | U.S. Cl. | 88/1.5, 95/44 |
|---|---|---|
| [51] | Int. Cl. | G03b 13/04 |
| [50] | Field of Search | 88/1.5; 95/44; 356/8 |

[56] References Cited
UNITED STATES PATENTS
2,780,129   2/1957   Wood.................... 88/1.5
FOREIGN PATENTS
1,050,183   2/1959   Germany.................. 88/1.5

*Primary Examiner*—Ronald L. Wibert
*Assistant Examiner*—F. L. Evans
*Attorneys*—Brown and Mikulka, William D. Roberson and Frederick H. Brustman ABSTRACT: A virtual image forming viewfinder is compacted by using a mirror to fold the optical path of the viewfinder in half. The reticle and the mirror which forms a virtual image of the reticle are proximate to each other and opposite the folding mirror. The result is a compact virtual image forming viewfinder one-half the thickness of the usual unfolded virtual image forming viewfinders.

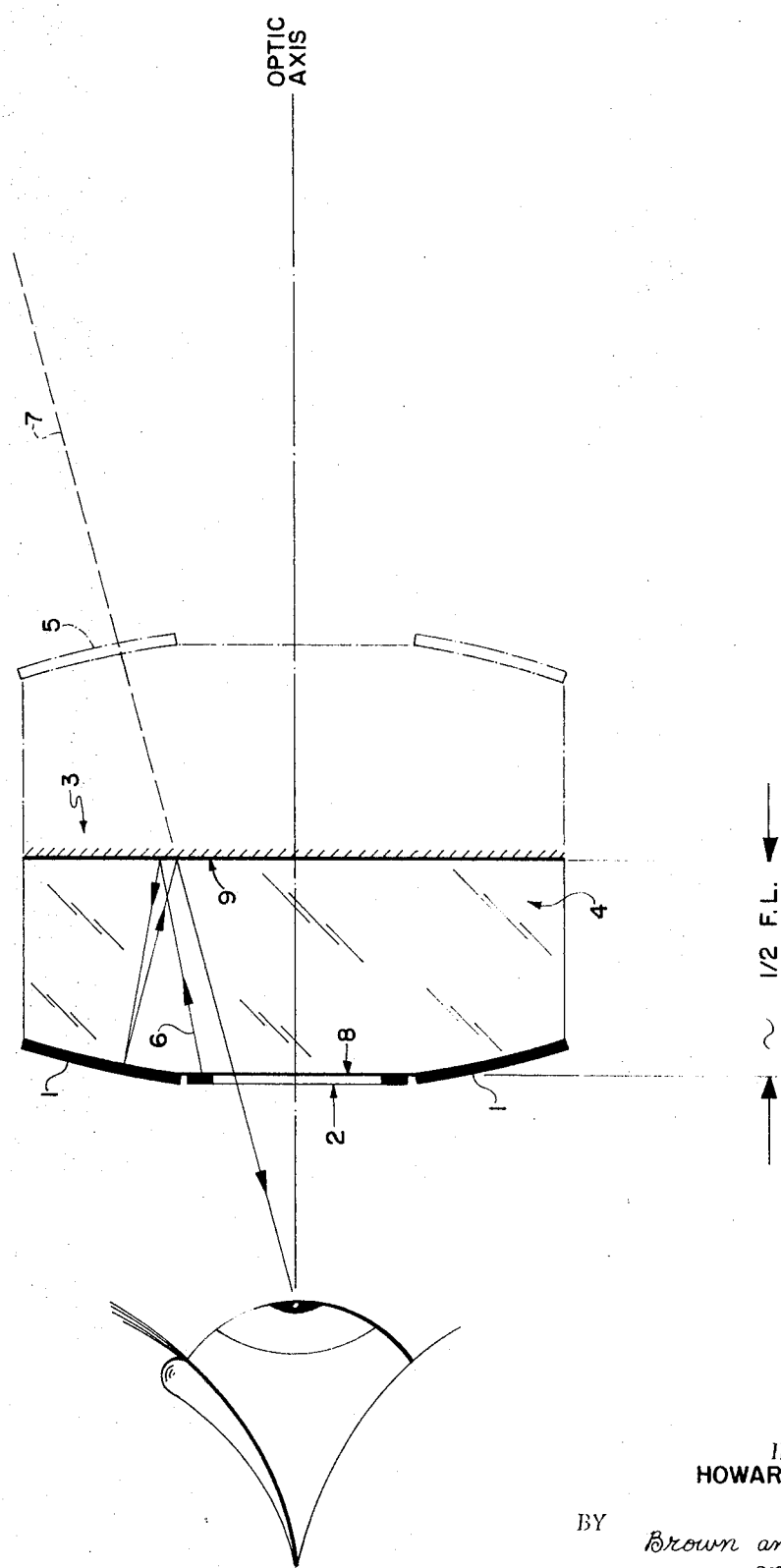

COMPACT VIEWFINDER

BACKGROUND OF THE INVENTION

With many optical devices, particularly photographic cameras, it is useful to have some means for the operator to determine the field of view of the device. One useful technique of outlining for an operator the field of view of his instrument is to provide it with an auxiliary optical device a viewfinder, through which the operator can sight to aim the principal device. One type of viewfinder includes a reticle and a partially transparent mirror for superimposing a virtual image of the reticle on the field of view seen by the operator through the viewfinder. The viewfinder is constructed so that the virtual image of the reticle subtends an angular field of view equal to the angular field of the principal optical device.

To the observer sighting through the viewfinder the image of the reticle appears to be a frame, floating in space, surrounding the scene in the viewfinder.

Prior efforts to produce a compact version of this kind of viewfinder have concentrated on eliminating unused portions of the basic structure and the simple expedient of reducing the dimensions of the component parts as much as possible.

Those skilled in the art appreciate that with a given aperture size long focal length mirrors have several advantages over mirrors of shorter focal length in the design of virtual image forming viewfinders. In a mirror of fixed aperture size a shorter focal length increases the effect on the reticle image of spherical aberration and curvature of field. The former gives the image of the reticle a fuzzy appearance and the latter causes portions of the reticle to be out of focus. In compact viewfinders the curvature can be compensated for by curving the surface the reticle is on, but this can introduce unwanted optical power to the viewfinder. The spherical aberration cannot be so simply compensated for. It is not practical to locate the aperture stop for the virtual reticle image forming mirror of the viewfinder to eliminate coma and astigmatism which are exaggerated by the lower $f$/no. Image distortion is also associated with low $f$/no. The steeper curvatures associated with viewfinders of this general class, which are made compact by reducing the focal length of the optical elements and other dimensions make them more difficult to manufacture too.

At a given aperture a longer focal length increases the $f$/no. and, as those skilled in the art can understand, reduces the severity of the aberrations described above. This invention involves a compact viewfinder having a virtual image forming mirror with a relatively long focal length to minimize the optical problems inherent in such viewfinders which are mere miniaturizations of common designs.

SUMMARY OF THE INVENTION

An object of this invention is a viewfinder which outlines the scene viewed through it with a virtual frame image.

Another object of this invention is a compact viewfinder which outlines the scene viewed through it with a virtual frame image.

Another object of this invention is a compact virtual frame image forming viewfinder wherein the imaging optic has a focal length significantly greater than the front-to-rear dimension of the viewfinder.

Still another object of the invention disclosed herein is a compact virtual frame image forming viewfinder which employs a relatively long focal length with a fixed aperture to reduce optical aberrations.

Other objects of the invention will in part be obvious and will in part appear hereinafter. The invention, accordingly, comprises the apparatus possessing the construction, combination of elements, and arrangement of parts which are exemplified in the following detailed disclosure and the scope of the application which will be indicated in the claims.

For a fuller understanding of the nature and objects of the invention, reference should be had to the following detailed description taken in connection with the accompanying drawing which is a sectional view of the compact folded virtual frame image viewfinder.

DESCRIPTION OF THE PREFERRED EMBODIMENT

In many optical devices where a viewfinder is employed for aiming the optical system, it is desirable for the viewfinder to have the smallest possible dimensions. Viewfinders for use with photographic cameras should clearly outline the scene which will be recorded.

Those skilled in the art know that prior attempts in constructing compact photographic viewfinders have suffered from various drawbacks and have not necessarily been very compact. Many solutions appear to involve simply cutting away unused portions of the viewfinder. Other solutions merely reduce all the dimensions of the viewfinder to the smallest practical size.

Other forms of compact viewfinders such as infinity finders have drawbacks in the appearance of the frame to the observer. The frame corners are not clearly defined and the edges are often curved. When such faults are corrected, the resulting viewfinders are no longer compact.

A preferred embodiment of a compact virtual frame image viewfinder constructed in accordance with this invention is shown in the drawing. The optical axis of the viewfinder is marked. The reticle 2 is located at the exit window 8 in the vicinity of the fully reflecting image forming mirror 1, which surrounds the exit window 8. The mirror 1 forms a virtual image, at infinity, of the reticle.

The mirror 1, which forms the virtual image of the reticle at infinity for the observer, may be a simple spherical type, although other shapes may also be used. The image forming mirror 1 has a central aperture coincident with the exit window 8 through which the observer can see. A partially transparent image forming mirror without a central aperture is suitable also, but not desirable because it makes inefficient use of the light passing through the viewfinder.

A surface with light reflecting properties 3 is located at the entrance window 9 opposite the reticle 2 and virtual image forming mirror 1. The light reflecting surface 3 is spaced apart from the exit window 8 by a distance equal to one-half the focal length of the image forming mirror 1. The light reflecting surface 3 reflects light emanating from the reticle 2 into the image forming mirror 1. The light reflecting surface 3 also reflects the virtual image formed by the mirror 1 of the reticle 2 out of the exit window 8 to the eye of the observer. With the reticle 2 at the focal point of the image forming mirror 1, the virtual image of the reticle is at infinity. Those skilled in the art know that the image appears to the observer to be merely far forward of the viewfinder and in the general vicinity of any scene.

The surface with light reflecting properties 3 is located so that the distance from the image forming mirror 1 to the light reflecting surface 3 and the distance from the reticle 2 to the light reflecting surface 3 are nominally equal to each other and the sum of the two distances is equal to the focal length of the imaging mirror 1. The total thickness of the compact viewfinder is, therefore, one-half the focal length of the imaging mirror 1.

A preferred embodiment of the invention is to form the compact viewfinder as a single transparent optical element 4. The rear surface of the element is molded with a curvature as required for the shape of the image forming mirror 1, except for a planar portion at the location of the exit window 8. The front surface of the element is molded with a planar surface to serve both the light reflecting surface 3 and the entrance window 9. The reticle 2 is formed on the planar exit window 8 portion of the element's rear surface. The desired reflecting properties of the image forming mirror 1 and the folding mirror 3 are attained by controlled evaporation of aluminum onto the respective surfaces of the transparent optical element. The single element form of the invention has advantages in the maintenance of alignment and trouble-free operation of the viewfinder.

For the purpose of understanding the function of the separate elements in this compact virtual frame image forming viewfinder, the light reflecting surface 3 which serves as a folding mirror, can be thought of as creating a reflection image 5 of the imaging mirror 1. This reflection image 5 of the imaging mirror 1 is shown in phantom on the drawing.

The reflection image 5 is spaced apart from the reticle 2 by a distance equal to the focal length of the reflected imaging mirror 1. Those skilled in the art will recognize the combination of the reticle 2 and the reflected image 5 of an imaging mirror to be the equivalent of a common virtual image forming viewfinder.

It is obvious that this invention comprising the reticle 2, the imaging mirror 1, and the folding mirror 3 forms a viewfinder which is considerably smaller and more compact than the usual virtual image forming viewfinder represented by the combination of the reticle 2 and the reflection 5 of the imaging mirror 1. Compact virtual image forming viewfinders according to the invention herein also suffer less from optical aberrations because of the relatively long focal length of the reticle imaging mirror 1. Folding the optical path of the virtual image forming viewfinder reduces the size by one-half. Additional compactness can be achieved by using more than one fold in the optical path of the compact viewfinder of this invention.

In one form of the invention light from the outside world enters the viewfinder through the entrance window 9 in the folding mirror 3 along the optic axis, and is diffusely reflected from the reticle 2. The path of light emanating from the reticle 2 is shown in the drawing by a representative light ray 6.

The light proceeds from the reticle 2 towards the folding mirror 3. The folding mirror 3 reflects the light ray 6 into the image forming mirror 1. The image forming mirror 1 reflects the light forming an image of the reticle 2 back to the folding mirror 3. The folding mirror 3 then undergoes the image formed by the imaging mirror 1 back and out through the exit window 8 in the rear surface of the viewfinder. With the imaging mirror 1 spaced an optical distance equal to its focal length from the reticle 2 as those skilled in the art appreciate, a virtual image of the reticle 2 is formed at infinity. The light forming the virtual image of the reticle appears, to the observer, to come from a point forward of the viewfinder in the direction of the apparent light ray 7, because of the final reflection the real light ray 6 undergoes at the folding mirror 3 prior to passing through the exit window into the eye of the observer.

When the compact virtual reticle image forming viewfinder is in use, the observer's eye is generally too close to the reticle 2 to focus on it. This is particularly true when the observer is concentrating on the scene appearing in the compact viewfinder which is some distance away. Therefore, the observer is generally not conscious of the reticle 2, but only its virtual image which appears to be in the vicinity of the scene being sighted through the compact viewfinder.

It is to be understood that certain details of this compact viewfinder can be varied without departing from the essential concept of the invention. The image forming mirror 1 does not have to take the form of a surface of revolution. It can be made of a series of cylindrical elements or other forms. The reticle 2 can be illuminated by ambient light or it can be self-luminous or even dark as the user chooses. The essential feature of the invention is to fold the optical path of the compact viewfinder one or more times.

Since certain changes may be made in the above apparatus without departing from the scope of the invention herein involved, it is intended that all matter contained in the above description or shown in the accompanying drawing shall be interpreted as illustrative and not in a limiting sense.

What I claim is:

1. A compact viewfinder comprising:
   a. an entrance window;
   b. an exit window;
   c. a surface with light reflecting properties at said entrance window;
   d. reticle means at said exit window; and
   e. image-forming mirror means, having a predetermined focal length, located proximate said exit window, separated from said entrance window by a distance equal to one-half said predetermined focal length, and cooperating with said surface with light reflecting properties, for forming a virtual image of said reticle means.

2. A compact viewfinder as in claim 1 wherein said virtual image appears to be at infinity.

3. A compact viewfinder as in claim 1 wherein said surface with light reflecting properties at said entrance window is planar.

4. A compact viewfinder as in claim 1 wherein said surface with light reflecting properties at said entrance window is a partially transparent mirror.

5. A compact viewfinder as in claim 1 wherein said reticle means defines a frame of reference.

6. A compact viewfinder as in claim 1 formed as a unitary solid transparent optical element defining both said entrance window and said exit window.

7. A compact viewfinder comprising a solid transparent optical element having:
   a. an exit window at its rear surface;
   b. a planar surface with light reflecting properties defining an entrance window;
   c. reticle means at said exit window; and
   d. a fully reflecting image-forming mirror, having a predetermined focal length, adjacent said rear surface surrounding said exit window, separated from said planar surface with light reflecting properties by a distance equal to one-half said predetermined focal length and cooperating with said planar surface to form a virtual image of said reticle means superimposed upon a field of view seen through said viewfinder.

8. A compact viewfinder comprising:

An eye station including a reticle;

Mirror means, having a predetermined focal length, for forming an image of said reticle; and reflective means, positioned outwardly of said reticle and said mirror means a distance not exceeding half said focal length and cooperable with said mirror means for providing a virtual image of said reticle viewable at said eye station.